(12) United States Patent
Fuldseth

(10) Patent No.: US 9,300,976 B2
(45) Date of Patent: Mar. 29, 2016

(54) VIDEO ENCODER/DECODER, METHOD AND COMPUTER PROGRAM PRODUCT THAT PROCESS TILES OF VIDEO DATA

(75) Inventor: Arild Fuldseth, Snaroya (NO)

(73) Assignee: Cisco Technology, Inc., San Jose, CA (US)

( * ) Notice: Subject to any disclaimer, the term of this patent is extended or adjusted under 35 U.S.C. 154(b) by 453 days.

(21) Appl. No.: 13/007,271

(22) Filed: Jan. 14, 2011

(65) Prior Publication Data

US 2012/0183074 A1 Jul. 19, 2012

(51) Int. Cl.
| | |
|---|---|
| *H04N 7/26* | (2006.01) |
| *H04N 19/436* | (2014.01) |
| *H04N 19/119* | (2014.01) |
| *H04N 19/61* | (2014.01) |
| *H04N 19/156* | (2014.01) |
| *H04N 19/174* | (2014.01) |

(52) U.S. Cl.
CPC ........... *H04N 19/436* (2014.11); *H04N 19/119* (2014.11); *H04N 19/156* (2014.11); *H04N 19/174* (2014.11); *H04N 19/61* (2014.11)

(58) Field of Classification Search
CPC .............. H04N 7/26; H04N 19/00781; H04N 19/00521
USPC ..................................... 375/240.24
See application file for complete search history.

(56) References Cited

U.S. PATENT DOCUMENTS

| | | | | |
|---|---|---|---|---|
| 5,471,248 | A | * | 11/1995 | Bhargava et al. ........ 375/240.24 |
| 6,040,879 | A | * | 3/2000 | Park .......................... 375/240.27 |
| 6,263,023 | B1 | | 7/2001 | Ngai |
| 2006/0078052 | A1 | * | 4/2006 | Dang ....................... 375/240.24 |
| 2006/0098737 | A1 | * | 5/2006 | Sethuraman et al. ..... 375/240.16 |
| 2010/0027680 | A1 | | 2/2010 | Segall et al. |

(Continued)

FOREIGN PATENT DOCUMENTS

| | | |
|---|---|---|
| CN | 101080008 A | 11/2007 |
| JP | 2000-244924 | 9/2000 |

(Continued)

OTHER PUBLICATIONS

Ngo et al., titled "Supporting Zoomable Video Streams with Dynamic Region-of-Interest Cropping", Feb. 2010, National University of Singapore.*

(Continued)

*Primary Examiner* — Tat Chio
*Assistant Examiner* — Nguyen Truong

(57) ABSTRACT

In video encoding it is common to encode the image data to remove redundancies in the information to be transmitted. While the pixel data is usually arranged in pixel blocks, the blocks can be arranged in one or more groups of N×M blocks called tiles. The tiles avoid the need to send header information on a tile-by-tile or block-by-block basis, and simplifies parallel processing of the tiles. Bits from respective tiles may then be reformatted to recreate bits according to a raster-scan direction. This enables the decoder to receive the bits in a regular raster-scan format, but also have the ability to decode the tiles once the bits are reformatted. By partitioning an image into tiles of size N×M, it is possible to further exploit the intra-frame correspondence of images in a vertical direction as well as horizontal direction since the tiles need not destroy as many dependencies between blocks in a tile as if the blocks where organized in slices or slice groups.

44 Claims, 8 Drawing Sheets

(56) References Cited

U.S. PATENT DOCUMENTS

2010/0232504 A1* 9/2010 Feng .................. 375/240.13
2012/0183074 A1 7/2012 Fuldseth

FOREIGN PATENT DOCUMENTS

JP          2000-244924 A     9/2000
JP           2000244924 A  *  9/2000  ............... H04N 7/30

OTHER PUBLICATIONS

International Search Report issued Apr. 10, 2012, in PCT/IB/2012/050138.
U.S. Appl. No. 13/839,850, filed Mar. 15, 2013, Fuldseth.
First Office Action and Search Report in counterpart Chinese Application No. 201280005158.7, issued Sep. 6, 2015, 17 pages.
Extended European Search Report in counterpart European Application No. 12734512.2, mailed Oct. 23, 2015, 8 pages.
Segall, et al., "A Highly Efficient and Highly Parallel System for Video Coding," Joint Collaborative Team on Video coding (JCT-VC) of ITU-T SG16 WP3 and ISO/IEC JTC1/SC29/WG11, 1st Meeting, Apr. 2010, 49 pages.
Huang, et al., "Ordered Entropy Slices for Parallel CODEC," Video Coding Expert Group (VCEG), 38th Meeting, Jul. 2009, pp. 1-10.
Fuldseth, et al., "Tiles," Joint Collaborative Team on Video Coding (JCT-VC) of ITU-T SG16 WP3 and ISO/IEC JTC1/SC29/WG11, 6th Meeting, Jul. 2011, 15 pages.
Zhou, Minhua, "Sub-picture based raster scanning coding order for HEVC UHD video coding," Joint Collaborative Team on Video Coding (JCT-VC) of ITU-T SG16 WP3 and ISO/IEC JTC1/SC29/WG11, 2nd Meeting, Jul. 2010, 5 pages.

* cited by examiner

| A0 | A1 | A2 | B0 | B1 | B2 |
|----|----|----|----|----|----|
| A3 | A4 | A5 | B3 | B4 | B5 |
| C0 | C1 | C2 | D6 | D7 | D8 |
| C3 | C4 | C5 | D0 | D1 | D2 |

VIDEO ENCODER/DECODER, METHOD AND COMPUTER PROGRAM PRODUCT THAT PROCESS TILES OF VIDEO DATA

BACKGROUND

1. Field of the Disclosure

The present application relates to video encoders/decoders, methods and computer program product generally, and more particular to video encoders/decoders, methods and computer program product that process groups of adjacent blocks arranged in tiles.

2. Description of the Related Art

The "background" description provided herein is for the purpose of generally presenting the context of the disclosure. Work of the presently named inventor, to the extent it is described in this background section, as well as aspects of the description which may not otherwise qualify as prior art at the time of filing, are neither expressly or impliedly admitted as prior art against the present invention.

A video encoder is typically implemented by dividing each frame of original video data in blocks of pixels. In existing standards for video compression (e.g., MPEG1, MPEG2, H.261, H.263, and H.264) these blocks would normally be of sized 16×16 and be referred to as macroblocks (MB). In the future HEVC/H.265 standard, the blocks would typically be larger (e.g. 64×64) and might be rectangular, for instance at frame boundaries.

Typically, the blocks are processed and/or transmitted in raster scan order, i.e. from the top row of blocks to the bottom row of blocks, and from left to right within each row of blocks.

For each block of original pixel data the encoding is typically performed in the following steps:

Produce prediction pixels using reconstructed pixel values from i) the previous frame (inter prediction), or ii) previously reconstructed pixels in the current frame (intra prediction). Depending on the prediction type, the block is classified as an inter block or an intra block.

Compute the difference between each original pixel and the corresponding prediction pixel within the block.

Apply a two-dimensional transform to the difference samples resulting in a set of transform coefficients.

Quantize each transform coefficient to an integer number.

Perform lossless entropy coding of the quantized transform coefficient.

Apply a two-dimensional inverse transform to the quantized transform coefficient to compute a quantized version of the difference samples.

Add the prediction to form the reconstructed pixels for the current block.

Moreover, in reference to FIG. 1, a current frame as well as a prediction frame are input to a subtractor 9. The subtractor 9 is provided with input from an intra prediction processing path 3 and a motion compensation processing path 5, the selection of which is controlled by switch 7. Intra prediction processing is selected for finding similarities within the current image frame, and is thus referred to as "intra" prediction. Motion compensation has a temporal component and thus involves analysis between successive frames that is referred to as "inter" prediction.

The output of the switch 7 is subtracted from the pixels of the current frame in a subtractor 9, prior to being subjected to a two dimensional transform process 13. The transformed coefficients are then subjected to quantization in a quantizer 15 and then subject to an entropy encoder 17. Entropy encoding removes redundancies without losing information, and is referred to as a lossless encoding process. Subsequently, the encoded data is arranged in network packets via a packetizer, prior to be transmitted in a bit stream.

However, the output of the quantizer 15 is also applied to an inverse transform and used for assisting in prediction processing. The output is applied to a deblocking filter 8, which suppresses some of the sharpness in the edges to improve clarity and better support prediction processing. The output of the deblocking filer 8 is applied to a frame memory 6, which holds the processed image pixel data in memory for use in subsequent motion processing.

The corresponding decoding process for each block can be described as follows (as indicated in FIG. 2). After entropy decoding 22 (to produce the quantized transform coefficients) and two dimensional inverse transformation 26 on the quantized transform coefficient to provide a quantized version of the difference samples, the resultant image is reconstructed after adding the inter prediction and intra prediction data previously discussed.

Some of the more detailed encoder and decoder processing steps will now be described in more detail. In video encoders, blocks can be divided into sub-blocks. Typically, the blocks are of fixed (square) size, while the sub-blocks can be of various e.g. (rectangular) shapes. Also, the partitioning into sub-blocks will typically vary from one block to another.

Inter prediction is typically achieved by deriving a set of motion vectors for each sub-block. The motion vectors define the spatial displacement between the original pixel data and the corresponding reconstructed pixel data in the previous frame. Thus, the amount of data that needs to be transmitted to a decoder can be greatly reduced if a feature in a first frame can be identified to have moved to another location in a subsequent frame. In this situation, a motion vector may by used to efficiently convey the information about the feature that has changed position from one frame to the next.

Intra prediction is typically achieved by deriving an intra direction mode for each sub-block. The intra direction mode defines the spatial displacement between the original pixel data and the previously reconstructed pixel data in the current frame.

Both motion vectors and intra direction modes are encoded and transmitted to the decoder as side information for each sub-block. In order to reduce the number of bits used for this side information, encoding of these parameters depends on the corresponding parameters of previously processed sub-blocks.

Typically, some form of adaptive entropy coding is used. The adaptation makes the entropy encoding/decoding for a sub-block dependent on previously processed sub-blocks. Entropy encoding is lossless encoding that reduces the number of bits that are needed to convey the information to a receiving site.

Many video encoding/decoding systems and methods apply a deblocking filter (8 in FIG. 2) across boundaries between blocks. Moreover, a deblocking filter is applied to blocks in decoded video to improve visual quality and prediction performance by smoothing the sharp edges which can form between blocks when block coding techniques are used. The filter aims to improve the appearance of decoded pictures.

The AVC/H.264 standard for video compression supports two mechanisms for parallel processing of blocks: Slices and Slice groups.

Slices

A slice in AVC/H.264 is defined as a number of consecutive blocks in raster scan order. The use of slices is optional on the encoder side, and the information about slice boundaries is sent to the decoder in the network transportation layer or in the bit-stream as a unique bit pattern.

The most important feature for slice design in AVC/H.264 is to allow transportation of compressed video over packet-based networks. Typically, one slice of compressed video data is transported as one packet. To ensure resilience to packet loss, each slice is independently decodable. As recognized by the present inventor this requirement implies that all dependencies between blocks of different slices are broken. In addition, key parameters for the entire slice is transported in a slice header.

Slice Groups

Slice groups in AVC/H.264 define a partitioning of the blocks within a frame. The partitioning is signalled in the picture header. Blocks are processed and transmitted in raster-scan order within a slice group. Also, as recognized by the present inventor, since a slice can not span more than one slice group, dependencies are broken between slice groups in the same manner as between slices. As recognized by the present inventor, slice groups are different from "tiles" (as will be subsequently be discussed in detail) in at least two important aspects. First, with slice groups, blocks are transmitted in raster scan order within the slice group. Having to decode a bit stream that uses raster-scan order within a slice-group is a highly undesirable requirement for many decoders, especially those using a single core. This is because pixels are best decoded in the same order as they are rendered and stored in memory for rendering on a display device. In the extreme case, a bit stream with slice groups could force the decoder to decode each frame one column (of blocks) at a time rather than one row (of blocks) at a time. Secondly, slice groups can specify non-contiguous partitions of a frame (e.g. checkerboard pattern). Having to decode e.g. all the "white" blocks before all the "black" blocks of a checkerboard pattern or even more sophisticated patterns place an even worse burden on a decoder. Because of these difficulties in implementing generic slice groups in AVC/H.264 decoders, the latest revision of the AVC/H.264 standard introduced a new profile (constrained profile) which disallowed the use of slice groups in the bit stream. Decoders not being able to decode slice groups could then claim compliance with the constrained profile (instead of the baseline profile). With tiles (as will be discussed in the detailed description), blocks are transmitted in raster-scan order within the frame which is the optimal transmission order for most single core decoders.

SUMMARY

It is to be understood that both the foregoing general description of the invention and the following detailed description are exemplary, but are not restrictive, of the invention.

The present inventor recognized limitations with conventional approaches for partitioning frames into groups of macroblocks. For example, although the dependency breaks that are defined for slices in AVC/H.264 are useful also for parallel processing, the definition of slices also has some disadvantages. The slice header implies a significant overhead that is not needed for parallel processing. Also, the grouping of blocks into slices needs to comply with the raster-scan processing of blocks. In turn, this imposes an unnecessary an often undesired restriction on how a frame can be divided into independently decodable blocks.

With respect to slice groups being able to make available many partitions, the present inventor recognized that rectangular partitions/slice groups are most relevant for parallel processing. Rectangular partitioning enables partitioning vertically (columns) as well as horizontally. Even though the definition of slice groups gives the encoder flexibility to define almost any partition of the frame, the scheme has some undesired implications on the decoder. In particular, the decoder is forced to process the blocks in the same order as the encoder (i.e. raster-scan within a slice group). This might have severe implications on the decoder implementation as the decoder must be designed to handle almost arbitrary scan-orders. Another disadvantage of the slice groups in AVC/H.264 is that a maximum of 8 slice groups are allowed, and that each slice group consist of a separate slice including a slice header.

Typically, a video decoder specification defines sequential block processing in raster scan order as the normal mode of operation. This ensures maximum compression efficiency by allowing dependency between neighbour blocks of the same frame to be exploited without restrictions. Typically, this implies that parameters for a given block depend on the same parameters in the blocks to the left and above. As described previously, this typically applies to reconstructed pixels for intra prediction, motion vector coding, intra direction mode coding, and adaptive entropy coding.

Independent of the sequential nature of video encoding/decoding methods, many hardware architectures are designed for parallel processing to maximize the throughput (number of pixels processed per second). Typically a processing device designed for parallel processing comprises a number of cores (typically between 2 and 100), each core being able to encode/decode a subset of the blocks within a frame in parallel with other cores. This is best achieved if there are no dependencies between blocks being processed on different cores. Thus there is a trade-off between compression efficiency and the degree of parallel processing (number of blocks being processes simultaneously).

Preferably, according to the present invention the cores have access to shared memory where the previous reconstructed frames are stored. In those cases, dependencies between neighbouring blocks only needs to be broken for the current frame, allowing for unrestricted choice of motion vectors.

Accordingly, one aspect of the present invention is it minimizes the penalty on compression efficiency, while maximizing the degree and flexibility of parallel processing when encoding video frames.

Moreover, another aspect of the present invention is that it introduces tiles as a group of N×M adjacent blocks with dependency breaks at the tile boundaries. As opposed to slices and slice groups, the definition of tiles is independent of the transmission order. The transmission order is assumed to follow the normal raster scan order within a frame (or slice group). This implies that an encoder/decoder can choose to perform all processing except bit-stream generation/parsing independently for each tile. Even if the encoder processes the frame by tiles, the decoder can choose to decode the frame in raster scan order.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIGS. 3a and 3b show a layout relationship between encoder processing order and transmission order respectively according to one embodiment.

DETAILED DESCRIPTION OF THE EMBODIMENTS

Figure 1:
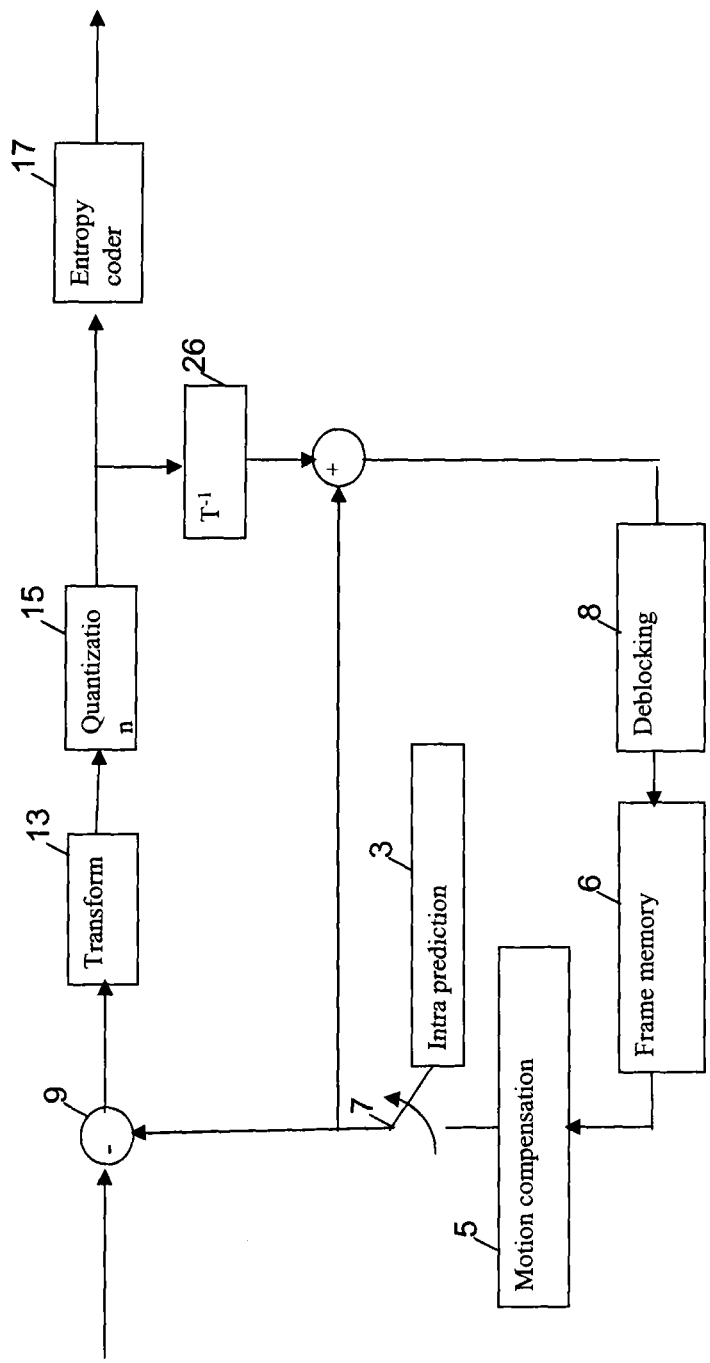
FIG. 1 is a block diagram of a video encoder.
Figure 2:
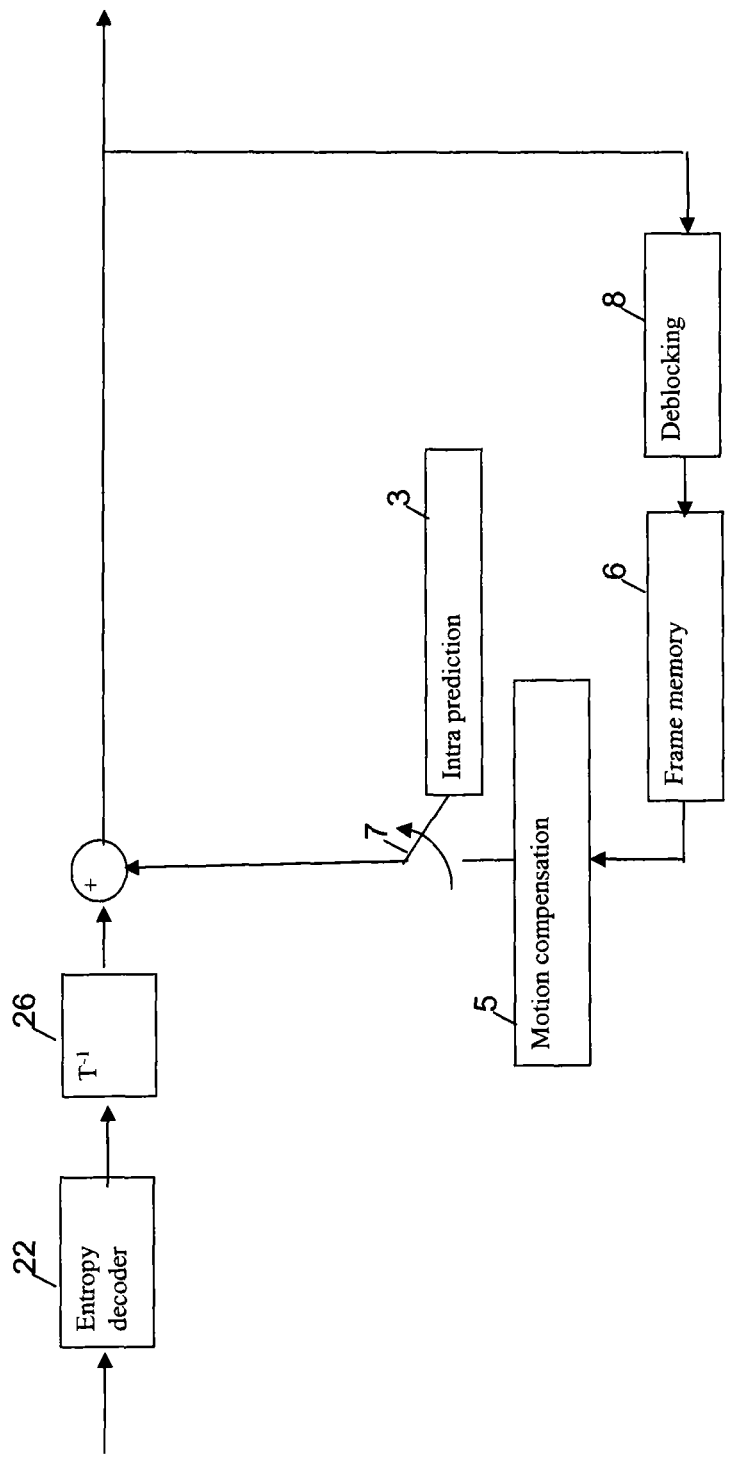
FIG. 2 is a block diagram of a video decoder.

The present embodiment introduces the notion of "tiles" to exploit the two dimensional dependencies between blocks while also supporting the exploitation of multiple processors, if available in the encoder, to simultaneously perform encoding operations on multiple tiles. The partitioning of a frame into tiles is completely specified by the numbers N and M, eliminating the need for a slice header, which is a basic requirement in conventional slice processing. Here, N and M are the height and width of a tile measured in number of blocks. Typically, the values of N and M are conveyed to the decoder in the sequence header or picture header resulting in negligible transmission bandwidth overhead. In addition to unilaterally transmitting the N and M numbers to the decoder in the sequence or picture header, an alternative is to have a handshaking operation between the decoding device and encoding device, where the values of N and M are exchanged, as well as perhaps the processing capabilities of the decoder.

By making the dependency breaks in a N×M tile, the system exploits the possibility in images to create both vertical boundaries as well as horizontal boundaries that minimally disturbed correspondences between blocks. Moreover, the content of a particular series of images may be a natural landscapes that often have horizontal dependencies (such as horizons, etc.). On the other hand, imagery involving forests or other vertical oriented images may benefit more greatly by having a larger vertical dimension so that more blocks in the vertical dimension may be included as part of a common tile, thereby allowing for the exploitation of the dependencies between blocks in the vertical direction. The specification of the numbers N and M specifies dependency breaks at tile boundaries by implication.

In a typical video encoder according to the present embodiment, at least the following dependencies are broken at tile boundaries (other dependencies may be broken as well depending on the relevant standard defining the decoding requirements):

Use of reconstructed pixels for intra prediction,
Use of motion vectors from neighbouring blocks for motion vector coding,
Use of intra direction modes from neighbour blocks.
Adaptive entropy coding based on previously encoded blocks.
Flushing of arithmetic coding bits.
Deblocking filter across tile boundaries, although this can be avoided if deblocking is performed as a separate pass on a single processing core.

FIG. 3a shows an arrangement of 2×3 tiles (arbitrarily choosing 2 as being the vertical component and 3 being the horizontal component of a tile, but vice versa would also be an acceptable convention). Blocks having a same letter belong to a common tile and therefore are best suitable for being processed with one processing core. Therefore, supposing four processing cores are available, the "A" tile may be processed by one core while separate cores may handle the B, C and D tiles respectively, where all the processing is done in parallel.

In a non-limiting context, the numbers in each tile of FIG. 3a represent an ordering of macro blocks (or other blocks) within the tile. For example, for tile A the first three blocks 0-2 are arranged in a horizontal row (in the raster scan direction), while a second row of blocks 3-5 are disposed in a row beneath the first row. Thus, the blocks are arranged in a two-dimensional group of blocks where the dependencies are broken at the vertical edge between tile A and tile B, and at the horizontal edge between tile A and tile C.

Figure 3B:
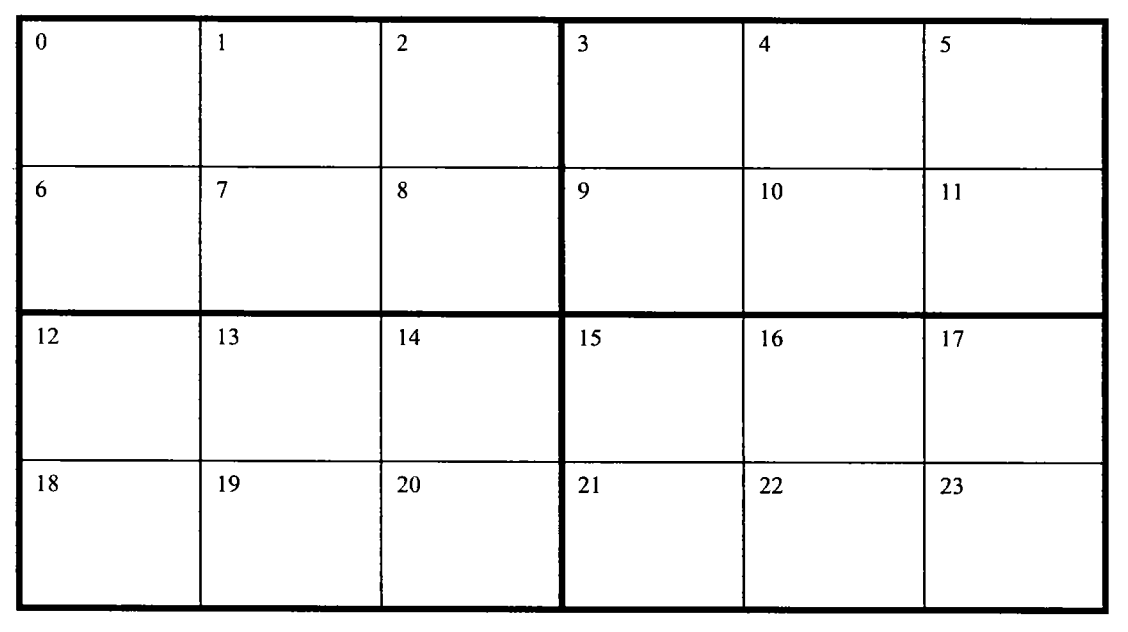

FIG. 3b shows the transmission order for the frame, which follows the raster-scan order. In order to reorder the bits from the tiles into the bits in raster scan order, a tile reformatter is used. Likewise, at the decoder, if processing by tiles is chosen, a tile formatter is used to return the bits to proper block for each tile. The tile reformatter at the encoder conversion changes the tile-order (A0, A1, A2, A3, A4, A5, B0, B1, B2, . . . ) as shown in FIG. 3a to raster-scan order (A0, A1, A2, B0, B1, B2, A3, A4, . . . ) as shown in FIG. 3b. Likewise, the tile formatter at the decoder performs a reordering operation from raster-scan order to tile-order.

Regarding this reformatting process, if the encoder processes in tiles and the bits from each tile were not reordered, the resulting bitstream would be in tile-order. In that case, the decoder would have two options could either a) do nothing with the bitstream and decode the blocks in tile-order, or b) convert to raster-scan order and then decode the blocks in raster-scan order. Both options are alternative embodiments, although they place an extra processing burden on the decoder. On the other hand, the primary embodiment reflected in the drawings is to have the encoder place the bits in raster-scan order In turn, this minimizes the processing burden on the decoder and allows the decoder to either: a) do nothing with the bitstream and decode the blocks in raster scan order (i.e. no tile penalty), or b) convert from raster-scan order to tile-order and decode the blocks in tile-order. Therefore, if the encoder processes in tiles and assumes the burden of converting from tile-order to raster-scan order the decoder are compelled to do nothing except respect the dependency breaks at the tile boundaries.

In an encoder according to the present embodiment, tiles are processed in parallel on different cores. Each core produces a string of compressed bits for that particular tile. In order to transmit the compressed data in raster scan order, the bits produced by different tiles/cores need to be reformatted. This is typically done on a single core.

Figure 4:
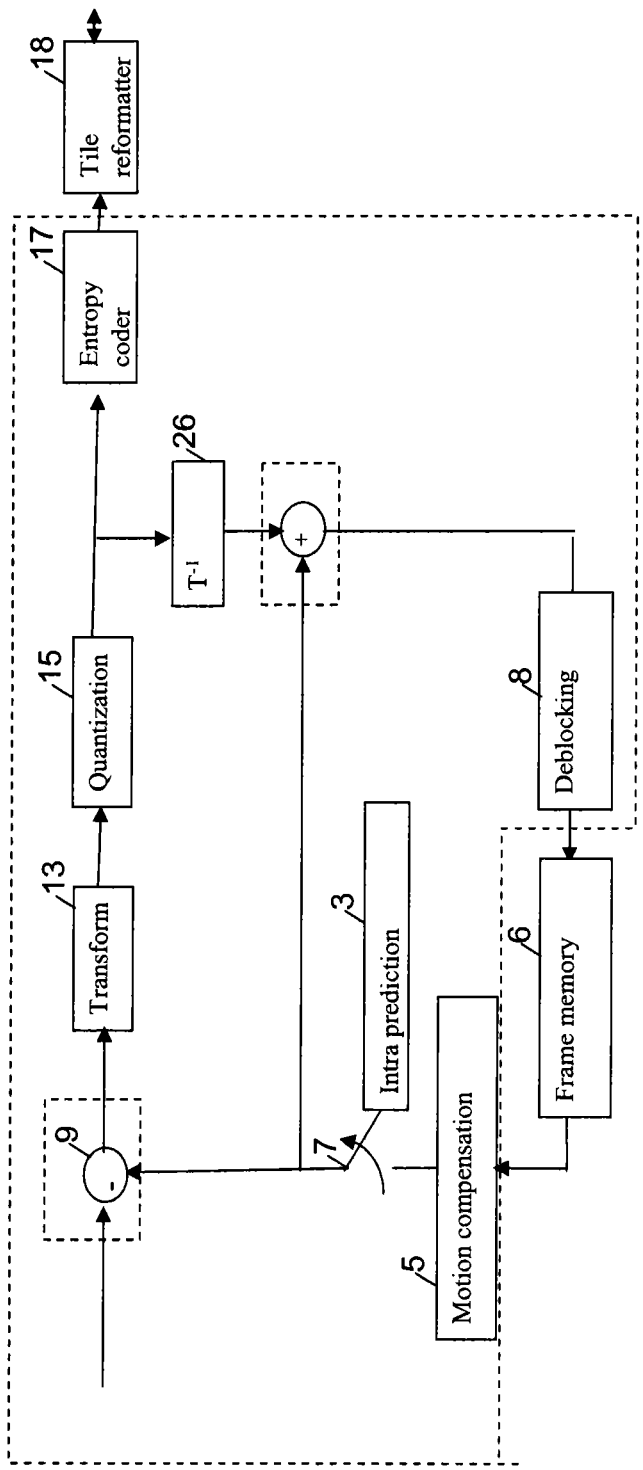
FIG. 4 shows a block diagram of an encoder according to an embodiment that supports parallel processing with the use of tiles.

A parallel processor embodiment is illustrated in FIG. 4, where the dashed line indicates modules that are processed in parallel on respective cores. Moreover, each core is assigned a processing task per tile (although there is no restriction on processing multiple tiles per core), and share memory resources to assist in sharing reference data for inter prediction between tiles and blocks. The frame memory resides in shared memory, while the tile reformatter is implemented on a single core. (Alternatively, the deblocking filter can run on a single core.) Moreover, the subtractor 9, transform 13, quantization 15, inverse transform 26, blocking filter 8, frame memory 6, motion compensation 5, intraprediction 3, switch 7 and entropy coder 17 are all similar to that described earlier in FIG. 1. However, in this multicore embodiment that provides tile-compatible processing, a tile reformatter 18 is used to retrieve and arrange bits from respective tiles so as to place them in raster scan order so that the bit stream sent from the encoder of FIG. 4 would be in raster scan order. Likewise, a decoder would optionally employ a corresponding tile formatter if it is configured to repackage the bits into the end by end tiles before decoding.

Another thing to note in FIG. 4, is the presence of dashed lines. As discussed above, a common core may perform all the functions, for example, of the transform 13, quantization 15, entropy coder 17, inverse transform 26, deblocking filter 8, motion compensation 5, switch 7 and interprediction 3. Because the tile reformatter 18 and frame memory 6 are available as a common resource amongst the different cores, each used for processing different tiles, the frame memory and tile reformatter 18 are not limited to use on a single core, but rather available for interfacing between the different cores. Likewise the subtractors and adders shown are implemented on a different core. The present arrangement of encoding functions on different cores is meant to be non-exhaustive. Instead, one aspect of having the arrangement in tiles is that there can be a correspondence between the tiles and the number of cores made available. Moreover, as discussed above, having multiple processor cores, provides available processing resources that may result in arranging a number of tiles to correspond with those cores.

At the decoder side, the decoder in the handshaking process with the encoder, can specify whether the tile reformatter 18 shall be used or not (in a tile partitioning mode or not). The tile partitioning mode allows for the reception of bits read out from respective tiles, without reformatting, or reformatted so as to place the bits in the same order as would be provided in a raster-scan or as would be done with a conventional encoder. Of course, in a more straightforward process, no handshaking is performed and the encoder and decoder always operate in the tile partitioning mode. It should be noted that when both the encoder and decoder operate in tile partitioning mode the tile reformatter (encoder) and tile formatter (decoder) are not needed since there is no need to put the bit-stream in raster scan order. Thus, the tile reformatter 18 and tile formatter 25 have an internal by-pass capability for passing the bit-stream there through without manipulation. Of course in FIGS. 4 and 5 the tile reformatter 18 and tile formatter 25 are also used to show the two way communication between the encoder and decoder. This connection is merely exemplary because the encoder and decoder can exchange information (such as the values for N and M through sequence- or picture headers) through any one of a variety of communication interfaces. Moreover, the bits representing the values N and M need not be reformatted in any way, and thus by-pass the reformatting and formatting functions in the tile reformatter 18 and tile formatter 25 respectively. In this same way, other message data exchanged between the encoder and decoder use the tile reformatter and tile formatter as a communications interface, without bit reordering.

Figure 5:
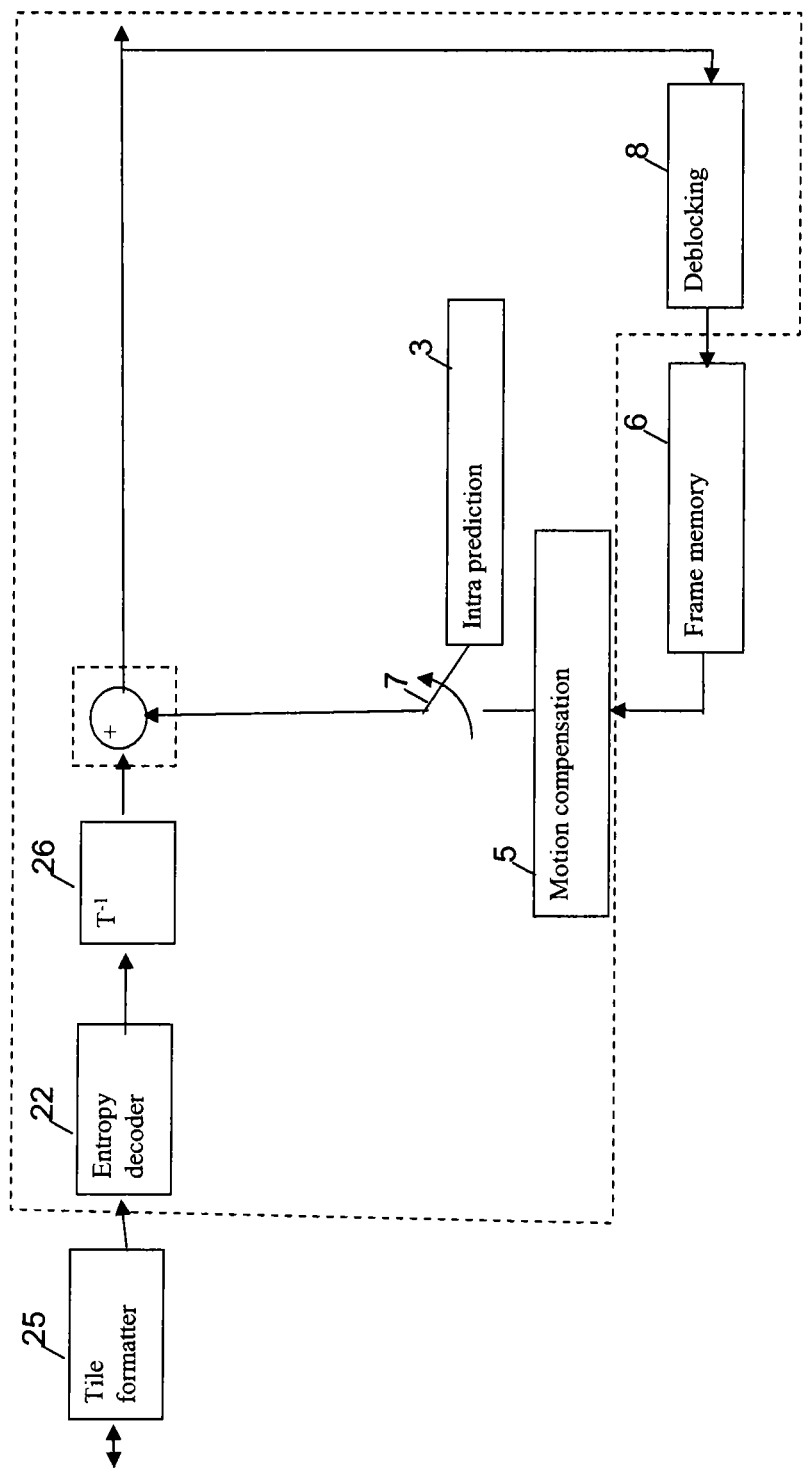
FIG. 5 is a block diagram of a decoder according to an embodiment that supports parallel processing with the use of tiles.

FIG. 5 is a block diagram of a decoder according to an embodiment that supports a tile portioning mode of operation, and includes parallel processing to assist in processing separate tiles. As was the case with FIG. 4, a dashed line indicates what decoding components are supported on a separate processing core, such that multiple cores may be used to simultaneously process tiles received from the encoder. The frame memory 6 is used as a common resource, similar to what is done at the encoder in FIG. 4. The tile formatter 25 initially receives the values N and M from the tile reformatter 18 from the encoder, although the tile reformatter does not perform any bit manipulation or reordering of these values. Instead, from the values N and M, the tile formatter 25 recognizes the tile shapes for the data arriving from the incoming bit stream and ultimately allows the decoder components to perform a decoding operation based on the tile partitioning (and associated dependency breaks) introduced at the encoder. Moreover, the decoder breaks the dependencies in the current frame between blocks at tile boundaries as dictated by the values N and M. It should be noted that the encoder may provide multiple pairs of N and M, indicating that each tile, or at least multiple tiles, in a frame can have a different rectangular shape.

In some instances, the decoder can specify its wishes to the encoder for required/desired values of N and M or whether to use tile partitioning at all. This may be useful, for example, by the decoder informing the encoder that the decoder can support only a 720p30 display format if not in tile partitioning mode, but could support 1080p30 display format if used in a tile partitioning mode using tiles that are not larger than N×M. This two-way communication between the encoder and the decoder is represented by a double headed arrow at the tile formatter 25 in FIG. 5.

When arranged in this way, tiles offer the advantage over conventional slices and slice groups in that no tile header is needed to identify tile boundaries. Moreover, there is no overhead required on a tile-by-tile or block-by-block basis to support the identification of tile boundaries. Instead, by specifying at first the shape of the tiles, or by reading the sequence or frame headers, the decoder has all the information it needs to identify tile boundaries based on the original specification of the values N and M. Also, the decoder has the option of using the tiles or not. In this way, the impact on the decoder is minimal since the decoder need not perform tile processing if it chooses not to. Also by allowing the encoder to specify different N×M shaped tiles, there is a large amount of flexibility with regard to arranging the number and size of the tiles to better support parallel processing and the speed with which encoding may be performed when multiple cores are available.

Moreover, tiles offer an advantage of decoupling the encoding process from the transmission order in which the bits are transmitted. This allows for better vertical intra prediction as opposed to conventional processes. Also, by using parallel tiles allows for better parallization for analysis since there is less constraint on tile shape and no header is required.

As further explanation, an advantage of breaking dependency at column boundaries (vertical boundaries), is that by dividing a frame vertically provides a smaller penalty on compression performance since a vertical boundary is shorter than a horizontal boundary when a 16:9 aspect ratio is the format for display, because motion generally tends to be performed in a horizontal direction. Also, parallelization by columns reduces a delay since the data arrives one row at a time from the camera and all available cores can start to work immediately on a new row, as it arrives. Thus, partitioning a frame into tiles allows for the more efficient use of available cores to begin immediate processing of data provided from a camera, as compared with conventional approaches using slices or slice groups.

Also, by using tiles, it is possible to be more flexible in the encoder for performing "stitching". Stitching is the collection of arbitrarily shaped rectangles which means that the change in spatial position of sub-pictures by manipulation in the compressed domain may be made possible.

Tiles also allow for more efficient packetization into (almost) fixed-sized packets. Thus a packetizer can assemble independent shelves of compressed data (one per column/row) into one packet without any backwards dependency to the encoding process. This helps provide autonomy in how data is transmitted from one location to the next for both transmission over separate communication paths, as well as processing independently at the decoder side. As discussed above, allowing for parallization by columns, also provides for finer-grained parallelism and better load balancing amongst processing cores.

Finally, another advantage of using tiles is that by encoding by smaller widths provides the opportunity to reduce memory bandwidth and internal memory as composed to slice processing or slice groups. Moreover, the reduction in memory bandwidth and internal memory may be made available even if a single-core implementation is used.

As a summary, below is a list of advantages of dependency breaks at column boundaries:
1) Dividing a frame vertically gives smaller penalty on compression performance since a vertical boundary is shorter than a horizontal boundary (assuming 16:9 aspect ratio) and because motion tends to be horizontally.
2) Parallelization by columns reduces the delay since data arrives one row at a time from the camera, and all cores can start to work immediately as a new row arrives.
3) Flexibility in the encoder to do "stitching" of arbitrarily shaped rectangles, i.e. change the spatial position of sub-pictures by manipulations in the compressed domain.
4) More efficient packetization into (almost) fixed-sized packets. The packetizer can assemble independent chunks of compressed data (one per column/row) into one packet without any backward dependency to the encoder process.
5) Parallelization by columns provides finer-grained parallelism and better load balancing.
6) Encoding by smaller widths might reduce the memory bandwidth and internal memory. This is true even for single-core implementations.

Figure 6:
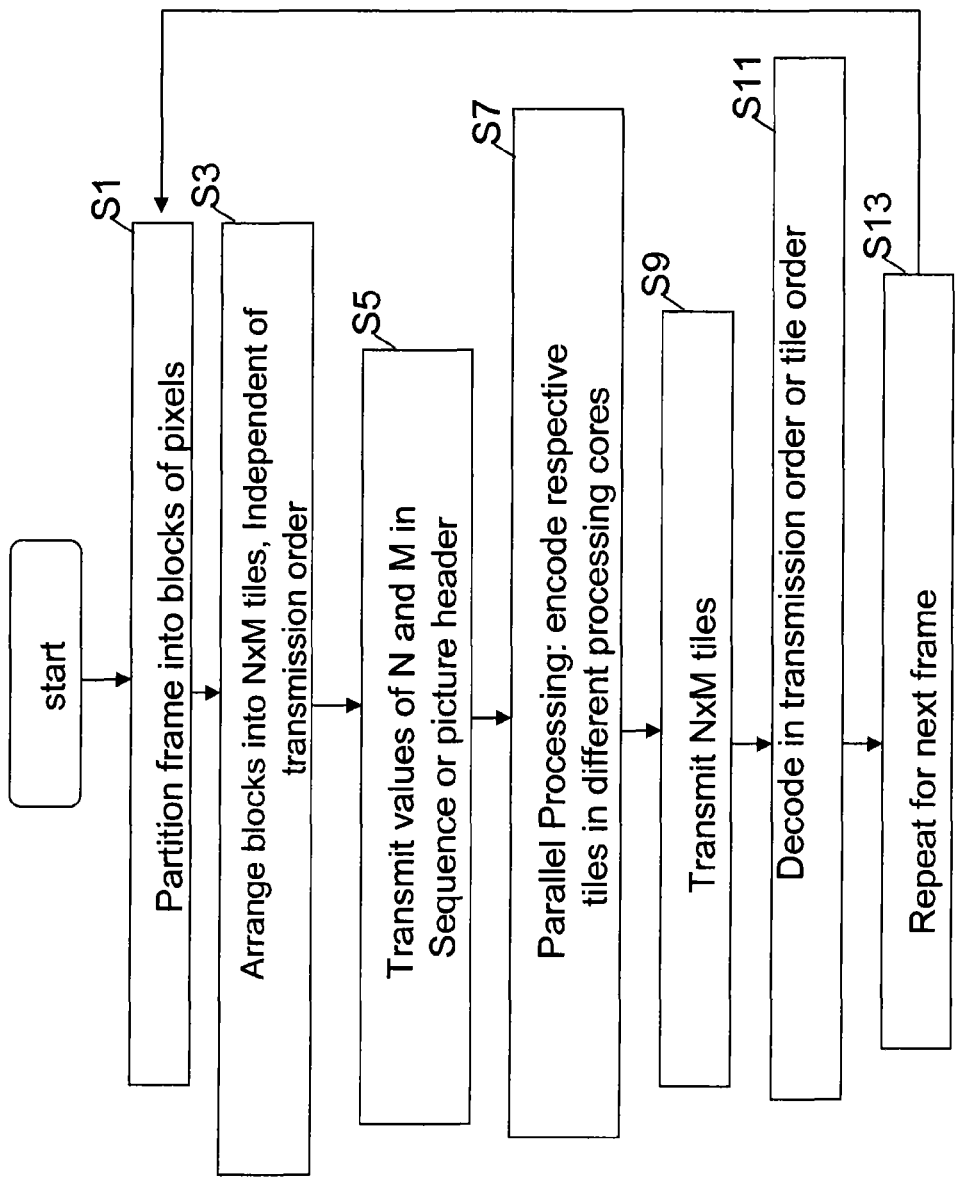
FIG. 6 is a flowchart of an exemplary process performed according to an embodiment of the present invention.

FIG. 6 is a flowchart showing a method for encoding frames using N×M tiles. The process begins in step S1, where a frame is portioned into blocks of pixels. The process then proceeds to step S3 where the blocks are arranged into N×M tiles. The tiles are grouped independent of the order of transmission of the blocks. The process then proceeds to step S5, where the values of N and M are transmitted to the receiving device in the sequence or picture header, but not in a slice or slice group header, recognizing that AVC/H.264 does not support anything but slices or slice groups. The tiles would not be compliant with AVC/H.264 because if the encoder decided to divide the frame into tiles, the decoder would not recognize the format. In a sequence header (before the first frame—which is part of the video stream, but after the call set up), the encoder would send the height and width of the tile. This way the decoder would know the size of the tiles. It should be noted that there can also be a pre-assignment of tile shape to type of frame, for example I (intra frame), B and P frames.

Each tile may then be encoded in parallel in step S7, where each tile is optionally encoded by a separate processing core. Of course a single core can process more than one tile. Also, devices with only one core can process all of the tiles. The process then proceeds to step S9 where the encoded tiles are transmitted to the receiving device. The transmission order can be in the raster scan order even though the tiles may have been encoded in a different order. Once transmitted to the decoder at the receiving device, the decoder decodes the tiles in step S11 with one or more cores. The process then repeats in step S13 for processing the next frame.

Figure 7:
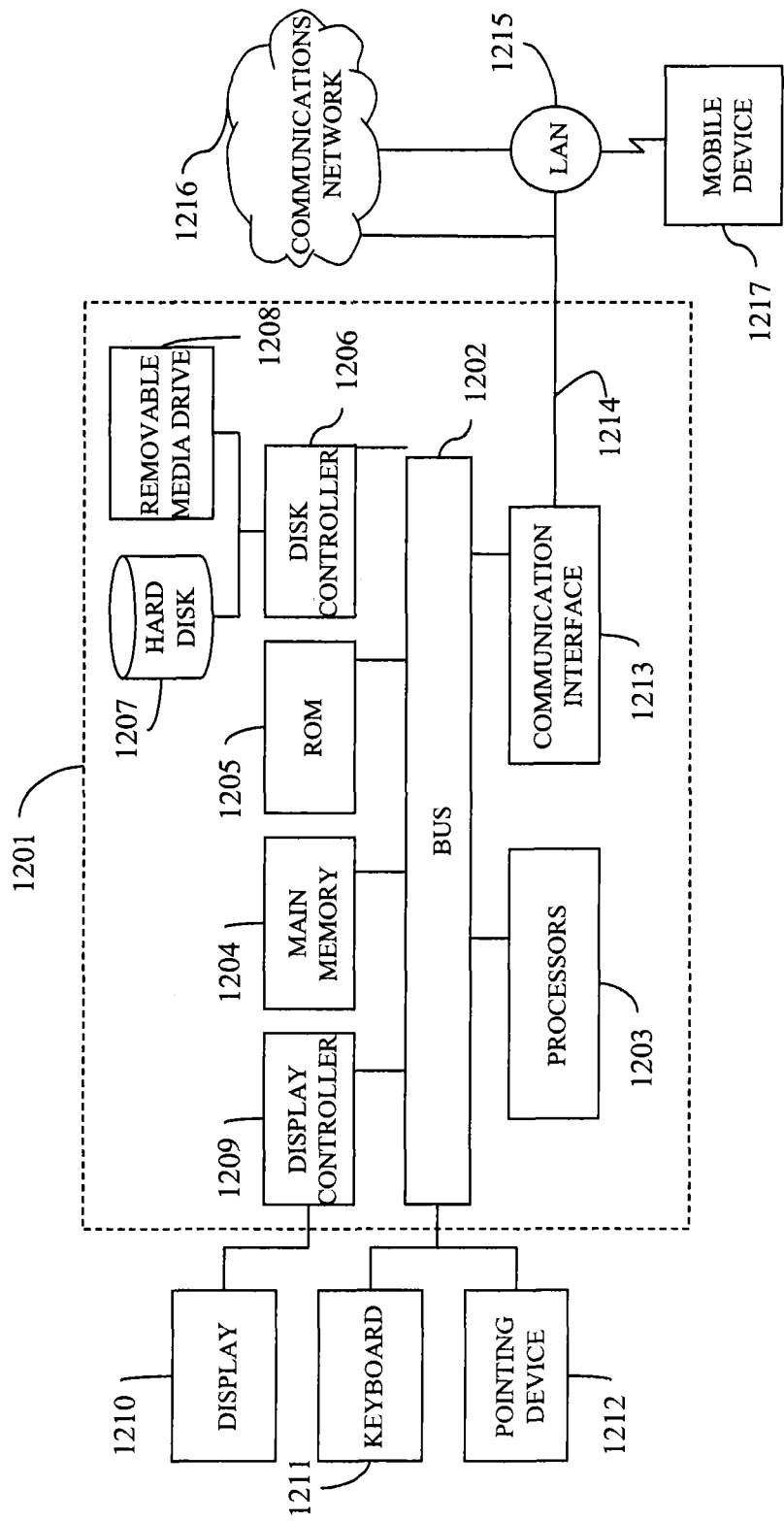
FIG. 7 is a block diagram of a host communication device according to an embodiment of the present invention that employs the use of tiles in video encoding and decoding.

FIG. 7 illustrates a computer system 1201 upon which an embodiment of the present invention may be implemented.

The computer system 1201 may be programmed to implement a computer based video conferencing endpoint that includes a video encoder or decoder for processing real time video images. The computer system 1201 includes a bus 1202 or other communication mechanism for communicating information, and a processor 1203 coupled with the bus 1202 for processing the information. While the figure shows a signal block 1203 for a processor, it should be understood that the processors 1203 represent a plurality of processing cores, each of which can perform separate Tile The computer system 1201 also includes a main memory 1204, such as a random access memory (RAM) or other dynamic storage device (e.g., dynamic RAM (DRAM), static RAM (SRAM), and synchronous DRAM (SDRAM)), coupled to the bus 1202 for storing information and instructions to be executed by processor 1203. In addition, the main memory 1204 may be used for storing temporary variables or other intermediate information during the execution of instructions by the processor 1203. The computer system 1201 further includes a read only memory (ROM) 1205 or other static storage device (e.g., programmable ROM (PROM), erasable PROM (EPROM), and electrically erasable PROM (EEPROM)) coupled to the bus 1202 for storing static information and instructions for the processor 1203.

The computer system 1201 also includes a disk controller 1206 coupled to the bus 1202 to control one or more storage devices for storing information and instructions, such as a magnetic hard disk 1207, and a removable media drive 1208 (e.g., floppy disk drive, read-only compact disc drive, read/write compact disc drive, compact disc jukebox, tape drive, and removable magneto-optical drive). The storage devices may be added to the computer system 1201 using an appropriate device interface (e.g., small computer system interface (SCSI), integrated device electronics (IDE), enhanced-IDE (E-IDE), direct memory access (DMA), or ultra-DMA).

The computer system 1201 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 1201 may also include a display controller 1209 coupled to the bus 1202 to control a display 1210, such as a cathode ray tube (CRT), for displaying information to a computer user. The computer system includes input devices, such as a keyboard 1211 and a pointing device 1212, for interacting with a computer user and providing information to the processor 1203. The pointing device 1212, for example, may be a mouse, a trackball, or a pointing stick for communicating direction information and command selections to the processor 1203 and for controlling cursor movement on the display 1210. In addition, a printer may provide printed listings of data stored and/or generated by the computer system 1201.

The computer system 1201 performs a portion or all of the processing steps of the invention in response to the processor 1203 executing one or more sequences of one or more instructions contained in a memory, such as the main memory 1204. Such instructions may be read into the main memory 1204 from another computer readable medium, such as a hard disk 1207 or a removable media drive 1208. One or more processors in a multi-processing arrangement may also be employed to execute the sequences of instructions contained in main memory 1204. In alternative embodiments, hard-wired circuitry may be used in place of or in combination with software instructions. Thus, embodiments are not limited to any specific combination of hardware circuitry and software.

As stated above, the computer system 1201 includes at least one computer readable medium or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of computer readable media, the present invention includes software for controlling the computer system 1201, for driving a device or devices for implementing the invention, and for enabling the computer system 1201 to interact with a human user (e.g., print production personnel). Such software may include, but is not limited to, device drivers, operating systems, development tools, and applications software. Such computer readable media further includes the computer program product of the present invention for performing all or a portion (if processing is distributed) of the processing performed in implementing the invention.

The computer code devices of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

The term "computer readable medium" as used herein refers to any medium that participates in providing instructions to the processor 1203 for execution. A computer readable medium may take many forms, including but not limited to, non-volatile media, volatile media, and transmission media. Non-volatile media includes, for example, optical, magnetic disks, and magneto-optical disks, such as the hard disk 1207 or the removable media drive 1208. Volatile media includes dynamic memory, such as the main memory 1204. Transmission media includes coaxial cables, copper wire and fiber optics, including the wires that make up the bus 1202. Transmission media also may also take the form of acoustic or light waves, such as those generated during radio wave and infrared data communications.

Various forms of computer readable media may be involved in carrying out one or more sequences of one or more instructions to processor 1203 for execution. For example, the instructions may initially be carried on a magnetic disk of a remote computer. The remote computer can load the instructions' for implementing all or a portion of the present invention remotely into a dynamic memory and send the instructions over a telephone line using a modem. A modem local to the computer system 1201 may receive the data on the telephone line and use an infrared transmitter to convert the data to an infrared signal. An infrared detector coupled to the bus 1202 can receive the data carried in the infrared signal and place the data on the bus 1202. The bus 1202 carries the data to the main memory 1204, from which the processor 1203 retrieves and executes the instructions. The instructions received by the main memory 1204 may optionally be stored on storage device 1207 or 1208 either before or after execution by processor 1203.

The computer system 1201 also includes a communication interface 1213 coupled to the bus 1202. The communication interface 1213 provides a two-way data communication coupling to a network link 1214 that is connected to, for example, a local area network (LAN) 1215, or to another communications network 1216 such as the Internet. For example, the communication interface 1213 may be a network interface card to attach to any packet switched LAN. As another example, the communication interface 1213 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1213 sends and receives electrical, electromagnetic or optical signals that carry digital data streams representing various types of information.

The network link 1214 typically provides data communication through one or more networks to other data devices. For example, the network link 1214 may provide a connection to another computer through a local network 1215 (e.g., a LAN) or through equipment operated by a service provider, which provides communication services through a communications network 1216. The local network 1214 and the communications network 1216 use, for example, electrical, electromagnetic, or optical signals that carry digital data streams, and the associated physical layer (e.g., CAT 5 cable, coaxial cable, optical fiber, etc). The signals through the various networks and the signals on the network link 1214 and through the communication interface 1213, which carry the digital data to and from the computer system 1201 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 1201 can transmit and receive data, including program code, through the network(s) 1215 and 1216, the network link 1214 and the communication interface 1213. Moreover, the network link 1214 may provide a connection through a LAN 1215 to a mobile device 1217 such as a personal digital assistant (PDA) laptop computer, or cellular telephone.

(Option 1) Obviously, numerous modifications and variations of the present disclosure are possible in light of the above teachings. It is therefore to be understood that within the scope of the appended claims, the invention may be practiced otherwise than as specifically described herein.

The invention claimed is:
1. A video encoder, comprising:
 at least one processor configured to partition a video frame into rectangular tiles to break dependencies between rectangular regions in the video frame and permit parallel processing of tiles in the encoder and at a decoder having a plurality of processors, wherein:
 the rectangular tiles including an integer number of two-dimensional blocks of pixels,
 a shape of each of the rectangular tiles being defined by section of the two-dimensional blocks of pixels that is N blocks high and M blocks wide, wherein values for N and M are independent of pixel values and such that tile dimensions may vary per video frame, and said processor is configured to transmit to a receiving device information indicating values for N and M in a header; and
an interface configured to transmit an output bit stream to the decoder.

2. The video encoder of claim 1, further comprising:
at least another processor configured to perform video encoding, wherein
said processor performs video encoding on a first tile of said rectangular tiles, and
said at least another processor performs video encoding on a second tile of said rectangular tiles, independent of the video encoding performed by the processor on the first tile.

3. The video encoder of claim 1, further comprising:
a plurality of processors, wherein each tile of said rectangular tiles is video encoded with a different one of the plurality of processors, each of the plurality of processors performing encoding on a respective tile independent of encoding performed on other tiles.

4. The video encoder of claim 3, further comprising a frame memory that is a shared resource among the plurality of processors.

5. The video encoder of claim 1, wherein the video frame includes more than 8 rectangular tiles.

6. The video encoder of claim 1, wherein the processor is configured to receive information from the decoder and set a size of N and M based on the information.

7. A video encoding method, comprising:
partitioning with at least one processor a video frame into rectangular tiles to break dependencies between rectangular regions in the video frame to permit parallel processing of tiles in an encoder or at a decoder having a plurality of processors, wherein said partitioning includes:
establishing the rectangular tiles with an integer number of two-dimensional blocks of pixels,
defining a shape of each of the rectangular tiles by section of the two-dimensional blocks of pixels that is N blocks high and M blocks wide, wherein values for N and M are independent of pixel values, and such that there are dependency breaks at tile boundaries and such that tile dimensions may vary per video frame; and
transmitting an output bit stream to a decoder in a tile order based on the shape of the rectangular tiles; and
transmitting, to a receiving device before the video frame, a header information indicating values of N and M.

8. The video encoding method of claim 7, wherein:
said encoding includes:
performing video encoding on a first tile of said rectangular tiles with a first processor, and
performing video encoding on a second tile of the rectangular tiles with a second processor, independent of the video encoding performed by the first processor on the first tile.

9. The video encoding method of claim 7, further comprising:
video encoding each tile of said rectangular tiles with one of a plurality of processors, each of the plurality of processors performing encoding independent of the encoding performed on other tiles.

10. The video encoding method of claim 9, further comprising sharing a frame memory as a resource among the plurality of processors.

11. The video encoding method of claim 7, wherein the partitioning includes partitioning the video frame into more than 8 rectangular tiles.

12. The video encoding method of claim 7, further comprising:
receiving information from the decoder and setting a size of N and M based on the information.

13. A non-transitory computer readable storage device having instructions stored therein that when executed by a processor perform a video encoding method, comprising:
partitioning with at least one processor a video frame into rectangular tiles to break dependencies between rectangular regions in the video frame to permit parallel processing of tiles in an encoder or at a decoder having a plurality of processors, wherein said partitioning includes:
establishing the rectangular tiles with an integer number of two-dimensional blocks of pixels,
defining a shape of each of the rectangular tiles by section of the two-dimensional blocks of pixels that is N blocks high and M blocks wide, wherein N and M are independent of pixel values, and such that there are dependency breaks at tile boundaries and such that tile dimensions may vary per video frame;
encoding each of the rectangular tiles; and
transmitting an output bit stream in a tile order based on the shape of the rectangular tiles; and
transmitting to a receiving device before the video frame a header that define sizes of N and M.

14. The non-transitory computer readable storage device of claim 13, wherein in the video encoding method, said encoding includes:
performing video encoding on a first tile of said rectangular tiles with a first processor, and
performing video encoding on a second tile of the rectangular tiles with a second processor, independent of the video encoding performed by the first processor on the first tile.

15. The non-transitory computer readable storage device of claim 13, wherein the video encoding method further comprising:
video encoding each tile of said rectangular tiles with one of a plurality of processors, each of the plurality of processors performing encoding independent of the encoding performed on other tiles.

16. The non-transitory computer readable storage device of claim 15, wherein the video encoding method further comprising:
sharing a frame memory as a resource among the plurality of processors.

17. The non-transitory computer readable storage device of claim 13, wherein in the video encoding method, said partitioning includes partitioning the video frame into more than 8 rectangular tiles.

18. The non-transitory computer readable storage device of claim 13, wherein the video encoding method further comprising:
receiving information from the decoder and setting a size of N and M based on the information.

19. A video decoder, comprising:
an interface configured to receive a bit stream of bits within a video frame that was encoded into rectangular tiles with dependencies broken between rectangular regions in the video frame; and
a plurality of processors configured to decode the video frame while respecting dependency breaks at tile boundaries, wherein a first of said plurality of processors configured to decode a first tile at a same time a second of said plurality of processors decodes a second tile, the rectangular tiles including an integer number of two-dimensional blocks of pixels, a shape of each of the rectangular tiles being defined by section of the two-dimensional blocks of pixels that is N blocks high and M blocks wide, wherein values for N and M are independent of pixel values and such that tile dimensions may vary per video frame, the values of N and M are conveyed from an encoder to the decoder in a header transmitted before the video frame.

20. The video decoder of claim 19, wherein said second of said plurality of processors performs video decoding on the second tile, independent of the processing performed by the first of said plurality of processors on the first tile.

21. The video decoder of claim 19, wherein each tile of said rectangular tiles is decoded with a different processor, and each different processor performing decoding independent of decoding performed on other tiles.

22. The video encoder of claim 19, further comprising:
a frame memory that is a shared resource among the plurality of processors.

23. The video decoder of claim 19, wherein the video frame includes more than 8 rectangular tiles.

24. The video decoder of claim 19, wherein:
said interface is configured to receive values of N and M in at least one of a sequence header and a picture header; and
said plurality of processors is configured to determine a shape of said rectangular tiles based on the values of N and M.

25. The video decoder of claim 19, wherein:
said interface is configured to convey to said encoder a message specifying at least one of:
a decoder functionality that is used by the encoder to set N and M, and
requested sizes of N and M.

26. A video decoding method, comprising:
receiving a bit stream within a video frame that was encoded into rectangular tiles with dependencies broken between rectangular regions in the video frame; and
decoding at a decoder with a plurality of processors at least part of the video frame while respecting dependency breaks at tile boundaries, wherein
the rectangular tiles including an integer number of two-dimensional blocks of pixels,
a shape of each of the rectangular tiles being defined by section of the two-dimensional blocks of pixels that is N blocks high and M blocks wide, wherein values for N and M are independent of pixel values and such that tile dimensions may vary per video frame,
the values of N and M are conveyed from an encoder to the decoder in a sequence header transmitted before the video frame, and
said decoding including a first tile with a first processor and independently decoding a second tile with a second processor.

27. The video decoding method of claim 26, further comprising:
the second processor performing video decoding on the second tile of said rectangular tiles independent of the processing performed by the first processor on the first tile.

28. The video decoding method of claim 26, wherein:
said decoding comprises decoding each tile of said rectangular tiles with a different processor and performed independent of decoding performed on other tiles.

29. The video decoding method of claim 28, wherein the video frame includes more than 8 rectangular tiles.

30. The video decoding method of claim 26, wherein:
said receiving step includes receiving values of N and M in at least one of a sequence header and a picture header; and
determining with at least one of said plurality of processors a shape of said rectangular tiles based on the values of N and M.

31. The video decoding method of claim 27, further comprising:
sending to an encoder a message specifying at least one of:
a decoder functionality that is used by the encoder to set N and M, and
requested sizes of N and M.

32. A non-transitory computer readable storage device having instructions stored therein that when executed by a processor at a decoder perform a video decoding method, comprising:
receiving a bit stream within a video frame that was encoded into rectangular tiles with dependencies broken between rectangular regions in the video frame; and
decoding with a plurality of processors at least part of the video frame while respecting dependency breaks at tile boundaries, wherein:
the rectangular tiles including an integer number of two-dimensional blocks of pixels,
a shape of each of the rectangular tiles being defined by section of the two-dimensional blocks of pixels that is N blocks high and M blocks wide, wherein N and M are independent of pixel size and such that tile dimensions may vary per video frame,
respective values of N and M need not be identical for each of the rectangular tiles,
the values of N and M are conveyed from an encoder to the decoder in a header transmitted before the video frame, and
said decoding including decoding a first tile with a first processor and simultaneously decoding a second tile with a second processor.

33. The non-transitory computer readable storage device of claim 32, wherein the method further comprising:
the second processor performing video decoding on the second tile of said rectangular tiles independent of the processing performed by the first processor on the first tile.

34. The non-transitory computer readable storage device of claim 32, wherein:
said decoding comprises decoding each tile of said rectangular tiles with a different processor and performed independent of decoding performed on other tiles.

35. The non-transitory computer readable storage device of claim 34, wherein the video frame includes more than 8 rectangular tiles.

36. The non-transitory computer readable storage device of claim 32, wherein:
said receiving includes receiving values of N and M in at least one of a sequence header and a picture header; and further comprising:
determining with at least one of said plurality of processors a shape of said rectangular tiles based on the values of N and M.

37. The non-transitory computer readable storage device of claim 32, wherein the method further comprising:
   sending to an encoder a message specifying at least one of:
      a decoder functionality that is used by the encoder to set N and M, and
      requested sizes of N and M.

38. The video encoder of claim 1, further comprising:
   a tile reformatter configured to reorder bits from the tile order based on the shape of the rectangular tiles to produce an output bit stream that arranges bits in raster-scan order with respect to the two-dimensional blocks of pixels.

39. The video encoding method of claim 7, further comprising:
   reordering bits from the tile order based on the shape of the rectangular tiles to produce an output bit stream that arranges bits in raster-scan order with respect to the two-dimensional blocks of pixels.

40. The video encoder of claim 1, wherein the information indicating values for N and M further indicates values for multiple pairs of N and M indicating that each tile, or at least multiple tiles in a video frame, can have a different rectangular shape.

41. The video decoder of claim 1, wherein dependency breaks of the tiles are respected and all tiles are processed by the same one of a plurality of processors, or two or more tiles are processed each with different ones of the plurality of processors.

42. The video encoder of claim 1, wherein dependencies between neighboring rectangular regions only are broken for a current video frame, allowing for unrestricted choice of motion vectors.

43. The method of claim 7, wherein dependencies between neighboring rectangular regions only are broken for a current video frame, allowing for unrestricted choice of motion vectors.

44. The non-transitory computer readable storage device of claim 13, wherein dependencies between neighboring rectangular regions only are broken for a current video frame, allowing for unrestricted choice of motion vectors.

\* \* \* \* \*

UNITED STATES PATENT AND TRADEMARK OFFICE
CERTIFICATE OF CORRECTION

PATENT NO. : 9,300,976 B2
APPLICATION NO. : 13/007271
DATED : March 29, 2016
INVENTOR(S) : Arild Fuldseth Page 1 of 1

It is certified that error appears in the above-identified patent and that said Letters Patent is hereby corrected as shown below:

In the Claims

In Col. 15, line 54, delete "sequence".

Signed and Sealed this
Seventh Day of June, 2016

Michelle K. Lee
*Director of the United States Patent and Trademark Office*